United States Patent
Hou et al.

(10) Patent No.: US 10,263,414 B2
(45) Date of Patent: Apr. 16, 2019

(54) ADAPTIVE IN-RUSH CURRENT CONTROL FOR MINIMIZING MOSFET PEAK TEMPERATURE UPON VOLTAGE STEP

(71) Applicant: Linear Technology Corporation, Milpitas, CA (US)

(72) Inventors: Zhizhong Hou, Fremont, CA (US); Mitchell E. Lee, San Jose, CA (US); Daniel J. Eddleman, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 276 days.

(21) Appl. No.: 15/176,022

(22) Filed: Jun. 7, 2016

(65) Prior Publication Data

US 2017/0063076 A1    Mar. 2, 2017

Related U.S. Application Data

(60) Provisional application No. 62/212,202, filed on Aug. 31, 2015.

(51) Int. Cl.
| | |
|---|---|
| *H02H 9/00* | (2006.01) |
| *H02H 9/02* | (2006.01) |
| *H02H 3/08* | (2006.01) |
| *H02H 3/087* | (2006.01) |
| *G05F 1/573* | (2006.01) |

(52) U.S. Cl.
CPC ............ *H02H 9/001* (2013.01); *H02H 9/02* (2013.01); *H02H 9/025* (2013.01); *G05F 1/573* (2013.01); *H02H 3/08* (2013.01); *H02H 3/087* (2013.01); *H02H 9/002* (2013.01); *H02H 9/004* (2013.01)

(58) Field of Classification Search
USPC .............................................. 361/93.7–93.9
See application file for complete search history.

(56) References Cited

U.S. PATENT DOCUMENTS

| | | | | |
|---|---|---|---|---|
| 6,717,784 B2 * | 4/2004 | Isago | ...................... | H02H 9/001 323/222 |
| 6,807,039 B2 * | 10/2004 | Priest | ...................... | H02H 9/004 361/93.1 |

(Continued)

OTHER PUBLICATIONS

Linear Technology Corporation, "LT4250L/LT4250H Negative 48V Hot Swap Controller", Product Catalog, 14 pages.

*Primary Examiner* — Danny Nguyen
(74) *Attorney, Agent, or Firm* — Patent Law Group LLP; Brian D. Ogonowsky

(57) ABSTRACT

In one embodiment, a pass MOSFET is coupled in series between an input voltage and a load, and a bypass capacitor is connected in parallel with the load. In response to a voltage step across the MOSFET, the MOSFET is adaptively controlled to conduct an in-rush current of $2I_{CL}=2I_L$ during the bypass capacitor 12 charging time, where $I_{CL}$ is the capacitive current and $I_L$ is the load current. This optimizes the in-rush current to achieve a minimum peak temperature of the MOSFET. In one embodiment, a ramp capacitor connected to the drain of the MOSFET is part of a feedback path that tracks the MOSFET drain voltage to control the gate voltage.

14 Claims, 5 Drawing Sheets

(56) References Cited

U.S. PATENT DOCUMENTS

| | | | | |
|---|---|---|---|---|
| 7,642,677 B2 * | 1/2010 | Harris | ............... | H02H 9/001 |
| | | | | 307/131 |
| 8,194,379 B2 | 6/2012 | Herr et al. | | |
| 8,299,767 B1 * | 10/2012 | Tuozzolo | ............ | H03K 17/0822 |
| | | | | 323/275 |
| 2006/0050541 A1 * | 3/2006 | Terdan | ............ | H02H 9/001 |
| | | | | 363/70 |

* cited by examiner

ADAPTIVE IN-RUSH CURRENT CONTROL FOR MINIMIZING MOSFET PEAK TEMPERATURE UPON VOLTAGE STEP

CROSS-REFERENCE TO RELATED APPLICATIONS

This application is based on and claims priority from U.S. Provisional Application Ser. No. 62/212,202, filed Aug. 31, 2015, by Zhizhong Hou et al., assigned to the present assignee and incorporated herein by reference.

FIELD OF THE INVENTION

This invention relates to systems with capacitive loads where an input voltage step condition occurs, such as a hot swap occurrence or when a fresh battery is applied to a system, and, in particular, to a circuit that optimizes control of a power MOSFET, coupling a power source to a load, to achieve a predetermined or minimum achievable peak temperature of the MOSFET while minimizing the in-rush current time.

BACKGROUND

When circuit boards are inserted into a live (e.g.,−48V) backplane or when a new battery is applied to a system, a bypass (filtering) capacitor connected across the board's power module can draw huge transient currents (in-rush currents) as it charges up. These transient currents can cause permanent damage to the board's components and cause glitches on the system power supply. There is a voltage step that occurs at the input of the system when power is initially applied or a new battery is connected. This voltage step may be tens of volts. If the voltage step to the load is instantaneous, the step can be potentially damaging to the load. Therefore, a ramping of the voltage to the load is desirable and is accomplished using a hot swap system.

A typical hot swap system allows a load (including any bypass capacitor across the voltage terminals) to be connected to a power supply so that the in-rush current into the load is limited to a particular maximum value to protect the system from over-currents and over-heating. The hot swap system typically includes a pass MOSFET in series between the power supply and the load, where the MOSFET is controlled to limit the current supplied by the power supply to a predetermined value. The current is typically sensed by detecting the voltage drop across a low value sense resistor in series with the MOSFET.

A conventional hot swap controller simply limits the current through the MOSFET to a predetermined value somewhere above a worst case acceptable load condition. Therefore, when the power supply is initially connected to the load (including a bypass capacitor) or if there is any other input voltage step, the charging ramp of the bypass capacitor will be limited (clamped). However, such a current limit level is typically set based on the normal operating conditions rather than for start-up or voltage step conditions. Thus, the current limit level is not optimized for the start-up or voltage step conditions. This can result in an unduly long charging time (if the current limit level is set too low) and/or an over-heating problem if the limited current occurs over an extended ramp time.

Another known technique is to use a capacitor (not the load's bypass capacitor) in the hot swap controller that charges at a controlled rate and is used to ramp up the gate voltage of the pass MOSFET to ramp up and control the in-rush current. However, there is no adaptive optimizing of the in-rush current for the particular load.

If the in-rush current is too high, the MOSFET will overheat. Surprisingly, if the in-rush current is made too low, the load (including the bypass capacitor) will take a long time to be fully powered up, and the MOSFET will overheat due to the extended power dissipation time. A MOSFET must not exceed a specified peak temperature, which may be supplied by the manufacturer or determined by testing.

What is needed is a circuit, such as for hot swapping or other condition where there is an input voltage step, where the in-rush current through the pass MOSFET is adaptively and optimally controlled to achieve a specified or minimum peak temperature of the pass MOSFET. After the bypass capacitor is fully charged, a conventional current limit circuit may then be used for over-current protection during normal operation.

SUMMARY

In a system that creates a voltage step, such as a hot swap system or a system that has its battery replaced, the in-rush current through a pass MOSFET is adaptively controlled to equal $I_{CL}$ plus $I_L$, where $I_{CL}$ is the in-rush current into the bypass capacitor (across the load's voltage input terminals) and $I_L$ is the current into the non-capacitive part of the load (e.g., such as a resistive load or fixed current load). The invention applies to any type of system that creates a voltage input step while charging a load capacitor.

Applicants have determined that an optimal in-rush current in such a system is when the total current through the pass MOSFET is adaptively forced to be twice the capacitor charging current $I_{CL}$. This is equivalent to forcing $I_{CL}=I_L$, since any excess of the capacitor charging current is the non-capacitive load current. Another way of looking at it is that the in-rush current is set to $2I_L$. With this optimal in-rush current, a minimum achievable peak temperature (hereinafter minimum peak temperature) of the pass MOSFET during the in-rush current phase occurs. Accordingly, given a certain peak temperature specified for the MOSFET, the inventive circuit controls the MOSFET to conduct an optimized in-rush current that minimizes the start-up time while the MOSFET operates at its specified peak temperature or its minimum peak temperature (depending on the goal of the design). At any greater in-rush current, or at any lower in-rush current, the specified peak temperature (or minimum peak temperature) will be exceeded. By applying the optimal in-rush current of $2I_L$ (or $2I_{CL}$), the lowest peak temperature of the MOSFET is achieved, enabling the use of a less expensive pass MOSFET.

Applicant proves in this disclosure how the peak temperature of the MOSFET is a minimum by forcing $I_{CL}=I_L$, where the rise in temperature of the MOSFET is due to the power dissipation over a period of time.

A circuit is described to achieve this optimal in-rush current (in a system with a voltage input step), where the circuit uses feedback. A fixed current source is applied to the gate of the MOSFET to turn it on. A ramp capacitor (separate from the load's bypass capacitor) is connected to the drain of the MOSFET and is charged with a particular current, where the charging current is based on the MOSFET's ramping drain voltage after an input voltage step. The charging current into the ramp capacitor also sets the total current through the MOSFET (and a pass resistor) during this in-rush current phase (e.g., at start-up). The charging current of the ramp capacitor, having a terminal connected to the ramping drain voltage of the MOSFET (getting closer to the source voltage), tracks the charging of the bypass capacitor, and this controls the current through the MOSFET. A feedback circuit detects signals related to the total current through the MOSFET and the ramp capacitor charging current and taps off current from the fixed current source to cause the MOSFET to only pass a current that is twice $I_{CL}$. Therefore, the non-capacitive load current $I_L$ is equal to $I_{CL}$. The current conducted by the MOSFET during this in-rush current phase may be constant if the load current is constant. After the bypass capacitor is fully charged, the current through the MOSFET drops to $I_L$, so will be about one-half the ramp-up current.

The optimal value of the ramp capacitor is a certain proportion of the known value of the bypass capacitor, and the value of the ramp capacitor and certain resistors are used to set the optimal MOSFET pass current (i.e., $2I_{CL}$) during the in-rush current phase. The actual load current $I_L$ is not required to be known, so no circuitry is needed to detect the actual $I_L$.

Once the load is fully charged, the inventive circuit no longer affects the current through the MOSFET, and the MOSFET is turned fully on by the full current from the fixed current source. A conventional current limit circuit can then be used during normal operation.

Accordingly, the in-rush current is dynamically controlled to be $2I_{CL}$ (equivalent to $2I_L$) based on the value of various components in the control circuit.

In a system using a constant known current load with a bypass capacitor, a ramp capacitor may not be needed to track the changing voltage step, and the current limit during the in-rush phase is optimized to be $I_{LIM}=2I_L$ until there is no more voltage step. After the in-rush current phase, the current through the MOSFET may be limited to a different current based on other considerations, such as an acceptable worst case load current during normal operating condition.

Various other circuits can be employed to achieve the optimal in-rush current through the MOSFET.

Although the peak temperature of the MOSFET will not be a minimum if the in-rush current is not equal to twice the load current (i.e., $I_{CL}$ is not equal to $I_L$), the benefits of the invention will still be achieved by the in-rush current being somewhat close to twice the load current. For example, one can use this discovery to control the peak temperature by setting the in-rush current through the MOSFET so that the charging current of the bypass capacitor due to the voltage step has a particular fixed ratio to the load current. In one example, the charging current of the bypass capacitor can be controlled to have a fixed ratio between about 0.5-1.5 of the load current and still provide an improvement over the prior art. Therefore, achieving the absolute minimum temperature of the MOSFET is not necessary to the invention.

Various other embodiments are described.

BRIEF DESCRIPTION OF THE DRAWINGS

Elements that are the same or equivalent are labeled with the same numeral.

DETAILED DESCRIPTION

One objective of this invention is to minimize the peak temperature of a pass MOSFET in a loaded power system during an input step condition (e.g., after a hot swap or changing a battery) so as to keep the MOSFET operating within its safe operating area (SOA). Alternatively, the peak temperature of the MOSFET may be specified by the manufacturer or by testing, and the invention automatically maximizes the start-up current through the MOSFET so that the MOSFET reaches, but does not exceed, the specified peak temperature.

Theoretical derivations are carried out to prove that there is an optimum output voltage ramp condition (across the load and bypass capacitor) that minimizes the peak temperature of the MOSFET. The values of certain components in the circuit are then selected to control the MOSFET to conduct the in-rush current level that causes the MOSFET to not exceed its predetermined peak temperature. Circuit topologies are described that adaptively control the output ramp to achieve the optimum condition.

In mission-critical power systems, a hot swap circuit is usually deployed to drive a MOSFET to pass the supply (or the input) voltage to the load (or the output) in a controlled manner.

Figure 1:
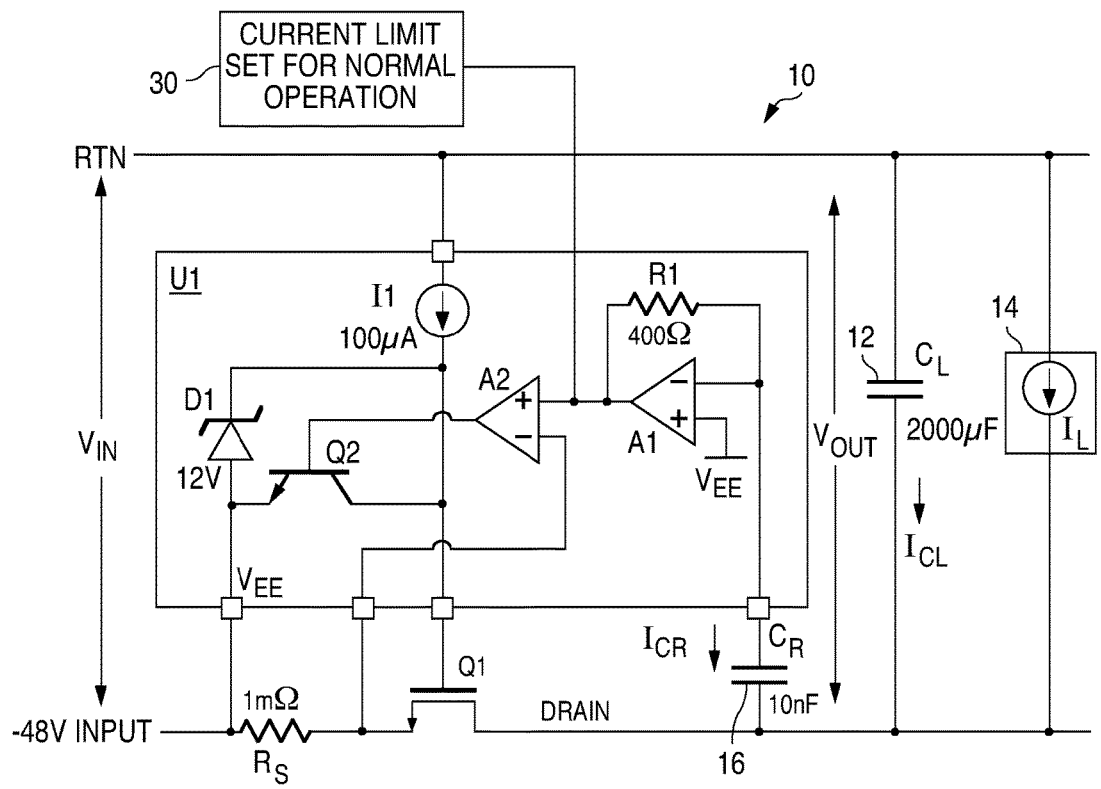
FIG. 1 illustrates a circuit in accordance with one embodiment of the invention that uses a ramp capacitor to track the bypass capacitor's in-rush current by tracking the MOSFET's drain voltage.

FIG. 1 illustrates a circuit 10 in accordance with one embodiment of the invention. The circuit 10 may be on a card, and the card may be inserted into a powered backplane to create an input voltage step, or a power source (e.g., a battery) may be replaced to create an input voltage step. Other conditions may create the input voltage step.

Where there is a bypass capacitor 12 across the load 14, there is an in-rush current upon an input voltage step. The bypass capacitor 12 filters the output voltage $V_{OUT}$ and helps supply current to the load 14 in transient situations.

The load 14 is shown as a constant current load (conducting the current $I_L$) but can have a variety of forms including resistive, constant power, or a mix of any of the above. LTspice simulations were conducted using a constant current load.

The bypass capacitor 12 typically has a value from tens to thousands of μF and is typically placed in parallel with the load 14. The capacitance is denoted as the capacitive load $C_L$.

During normal operation conditions (bypass capacitor 12 is fully charged), the pass MOSFET Q1 is fully on and carries the load current $I_L$ with a small voltage drop between its input (source) and output (drain). The drain-source voltage of the MOSFET in the on-state $V_{DS(ON)}$ is:

$$V_{DS(ON)} = I_L R_{DS(ON)} \quad \text{1)}$$

where $R_{DS(ON)}$ is the on-resistance of the MOSFET Q1, which is usually measured in milli-Ohms. A low $R_{DS(ON)}$ MOSFET Q1 should be chosen so that the power dissipation of the MOSFET Q1 in the on-state, $$P_{(ON)} = I_L^2 R_{DS(ON)} \quad \text{2)}$$

is lower than 1 W.

In events such as battery hot swapping (replacing a dropping-out battery with a newly charged battery), a supply surge, or plugging a card into a powered backplane, the input voltage $V_{IN}$ has a sudden jump (or an input step). The magnitude of the input step, $\Delta V$, can be as large as tens of volts. As long as the supply voltage does not exceed the over-voltage limit, the input step is not a fault condition and the system should stay on.

In the presence of the capacitive load $C_L$, the output voltage $V_{OUT}$ does not follow the input voltage $V_{IN}$ immediately, but rather ramps up from the initial supply voltage (just before the hot swap) to the new supply voltage while charging the bypass capacitor 12. This causes the $V_{DS}$ of the MOSFET Q1 to initially jump to $\Delta V$ and then ramp down to $V_{DS(ON)}$, assuming the load 14 is a constant current load.

Additionally, during the output voltage ramp, the MOSFET Q1 not only carries the load current $I_L$ but also the capacitive current $I_{CL}$, so the power dissipation is now $$P = V_{DS}(I_L + I_{CL}) \quad \text{3)}$$

where $I_{CL}$ is proportional to $C_L$ and the voltage ramp rate:

$$I_{CL} = C_L \frac{dV_{OUT}}{dt} = -C_L \frac{dV_{DS}}{dt} \quad \text{4)}$$

where $V_{OUT}$ is the output voltage and t is time. For a linear ramp, $I_{CL}$ is constant:

$$I_{CL} = C_L \frac{\Delta V}{\Delta t} \quad \text{5)}$$

where $\Delta t$ is the time interval of the ramp.

The initial power upon the input step, $$P_0 = \Delta V (I_L + I_{CL}) \quad \text{6)}$$

can potentially be hundreds or a few thousands of Watts and thus be a serious electrical stress to the MOSFET Q1.

If the output ramp is excessively slow, the power decays very slowly and the MOSFET Q1 can be heated up to temperatures that cause damage. On the other hand, if the output ramp is very fast, $I_{CL}$ can be very large, causing a very high initial power that also endangers the MOSFET Q1.

The circuit of FIG. 1 adaptively controls the dissipation of power in the MOSFET Q1 so that a specified or minimum peak temperature is achieved.

Discovery of the Optimum Output Voltage Ramp

The temperature rise $\Delta T$ of a MOSFET caused by a power pulse is proportional to the convolution integration of the power P versus time t:

$$\Delta T = k_T \int_0^\tau \frac{P(\tau - t)}{\sqrt{t}} dt \quad \text{7)}$$

where the constant $k_T$ contains thermal and physical properties of the MOSFET and $0 < \tau < t$. Our interest lies in the integral and we use $P\sqrt{t}$ to designate it $$P\sqrt{t} \equiv \int_0^\tau \frac{P(\tau - t)}{\sqrt{t}} dt \quad \text{8)}$$

Consider the case of the input step with a constant $I_L$ and a linear output ramp ($I_{CL}$ is also constant). The power can be expressed as $$P(t) = \Delta V \left(1 - \frac{t}{\Delta t}\right)(I_L + I_{CL}) \quad \text{9)}$$

where the on-state power $P_{(ON)}$ is neglected since it is small. For the decaying triangular power pulse, the peak temperature is reached at $\Delta t/2$, at which time $$P\sqrt{t} = \int_0^{\frac{\Delta t}{2}} \frac{P\left(\frac{\Delta t}{2} - t\right)}{\sqrt{t}} dt \quad \text{10)}$$

Use equation (5) for $I_{CL}$ and substitute equation (9) into equation (10) to reduce equation (10) to $$P\sqrt{t} = \frac{2\sqrt{2}}{3} \sqrt{C_L \Delta V^3 \frac{(I_L + I_{CL})^2}{I_{CL}}} \quad \text{11)}$$

By solving $$\frac{\partial (P\sqrt{t})}{\partial I_{CL}} = 0 \quad \text{12)}$$

the optimum $I_{CL}$ that results in the minimum $P\sqrt{t}$ is $$I_{CL,opt} = I_L \quad \text{13)}$$

and the minimum $P\sqrt{t}$ is $$(P\sqrt{t})_{min} = \frac{4\sqrt{2}}{3} \sqrt{C_L I_L \Delta V^3} \quad \text{14)}$$

$P\sqrt{t}$ is proportional to the change in temperature of the pass MOSFET during the in-rush current phase.

Figure 2:
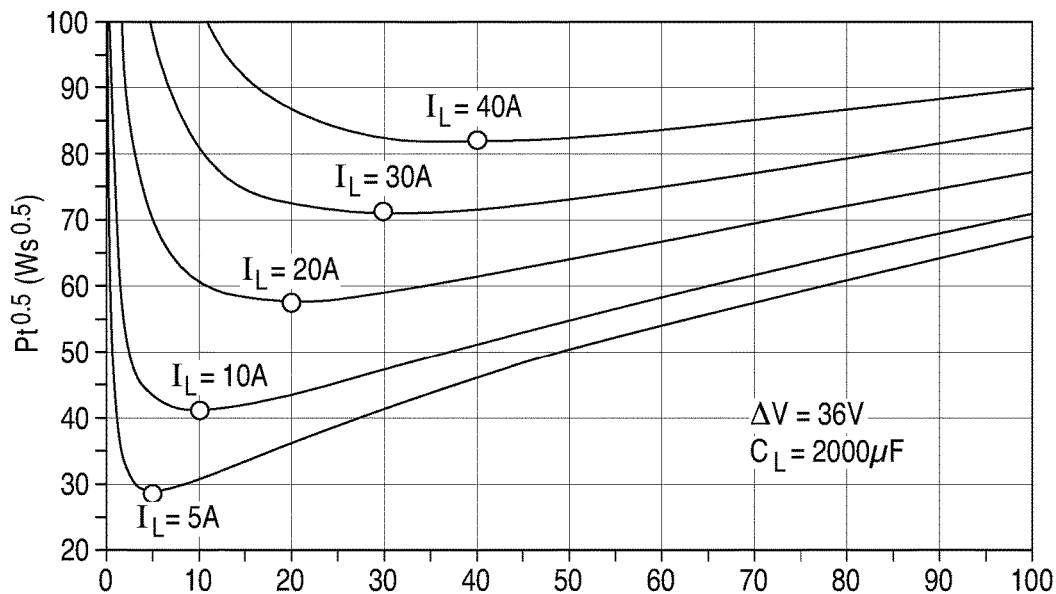
FIG. 2 is a graph of capacitive current $I_{CL}$ vs. $P\sqrt{t}$, where $P\sqrt{t}$ is the power dissipated by the pass MOSFET multiplied by the square root of the time the MOSFET is dissipating the power. $P\sqrt{t}$ is proportional to the change in temperature of the MOSFET.

The same conclusion can be reached by plotting $P\sqrt{t}$ versus $I_{CL}$ using equation (11) as shown in FIG. 2, where $\Delta V = 36V$ and $C_L = 2000$ μF. Each curve represents a different constant load current between 5 A and 40 A. It can be seen that P√t of each curve reaches its minimum when $I_{CL}=I_L$. Any in-rush current that is different from $I_{CL}=I_L$ results in a higher peak temperature of the MOSFET.

In summary, if the capacitive current $I_{CL}$ through the MOSFET equals the load current $I_L$ through the MOSFET, the peak temperature of the MOSFET Q1 is minimized during the output voltage ramp following an input step. The simulations of FIGS. 3A-3E and 4A-4E show that this statement holds true for at least constant current loads and resistive loads.

Circuits for Adaptive Output Voltage Ramp Control

The optimum $I_{CL}$ given by equation (13) can be realized by monitoring the MOSFET Q1 drain voltage ramp rate and adaptively forcing the total in-rush current through the MOSFET Q1 to be twice the capacitive current $I_{CL}$ while the bypass capacitor 12 is charging. This is equivalent to forcing $I_{CL}=I_L$.

The circuit 10 implementing this method for a −48V power system (e.g., a telecom system) is show in FIG. 1. VEE is at the same potential as the −48V input and serves as the common ground of sub-circuit U1 (e.g., an integrated circuit with five terminals).

Current source I1 turns the MOSFET Q1 on, and Zener diode D1 limits the gate-source voltage to 12V. The low value sense resistor $R_S$ is used to monitor the total current $I_{RS}$ through the MOSFET Q1, and the control target is $$I_{RS}=2I_{CL}=2I_L \quad 15)$$

A ramp capacitor 16, having a value $C_R$, is used to monitor the ramp rate of the $V_{DS}$ of the MOSFET:

$$-\frac{dV_{DS}}{dt} = \frac{I_{CL}}{C_L} = \frac{I_{CR}}{C_R} \quad 16)$$

where $I_{CR}$ is the capacitive current into the ramp capacitor 16.

Transimpedance amplifier A1 converts $I_{CR}$ to a VEE referred voltage: $I_{CR}$ R1. Servo amplifier A2 (a differential amplifier) along with MOSFET Q2 actively controls MOSFET Q1 and forces $$I_{CR}R1=I_{RS}R_S \quad 17)$$

Combine equations (16)-(17) to have $$I_{CL} = \frac{R_S C_L}{R1 C_R} I_{RS} \quad 18)$$

Since $I_{RS}=I_{CL}+I_L$, equation (18) gives $$\frac{I_{CL}}{I_L} = \frac{R1 C_R}{R_S C_L - R1 C_R} \quad 19)$$

where R1 and $C_R$ should be chosen so that $R_S C_L > R1 C_R$.

Equation (10) indicates that the circuit 10 in FIG. 1 controls the in-rush current through the MOSFET Q1 to maintain a fixed ratio between the charging current of the bypass capacitor $I_{CL}$ and the load current $I_L$.

With the condition defined by equation (15) satisfied, equation (19) leads to the optimum ramp capacitor value $C_{R,opt}$:

$$C_{R,opt} = \frac{2R_S}{R1} C_L \quad 20)$$

For a given load capacitance $C_L$ (which is fixed for an application), choose the optimum ramp capacitor value according to equation (20) to achieve a fixed ratio of one between the charging current of the bypass capacitor and the load current, and the peak temperature of MOSFET Q1 upon an input step will be automatically minimized with any type of load. With $C_L=2000$ μF and the component values shown in FIG. 1, $C_{R,opt}=10$ nF. This optimum ramp capacitor value (to minimize the peak temperature of the MOSFET Q1) may be used to select a MOSFET type that has the calculated "minimized" peak temperature. Therefore, the cost of the MOSFET Q1 can be minimized. Or, if the peak temperature of the MOSFET Q1 to be used is given, the value of the ramp capacitor $C_R$ can be selected, based on the equations above, to cause the MOSFET Q1 temperature to achieve, but not exceed, the predetermined peak temperature.

Figure 3A:
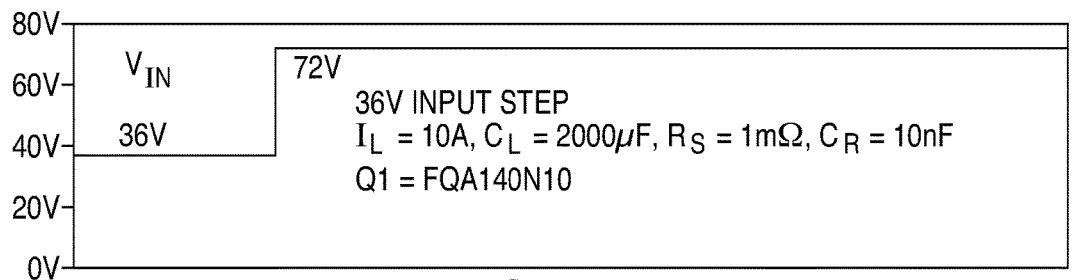
FIGS. 3A-3E are graphs obtained by simulations showing signals and temperatures in the circuit of FIG. 1 for a constant load current $I_L$, where a bypass capacitor is connected across the load. The simulation shows that the peak temperature of the MOSFET is a minimum when the ramp capacitor value is selected such that $I_{CL}=I_L$.
Figure 3B:
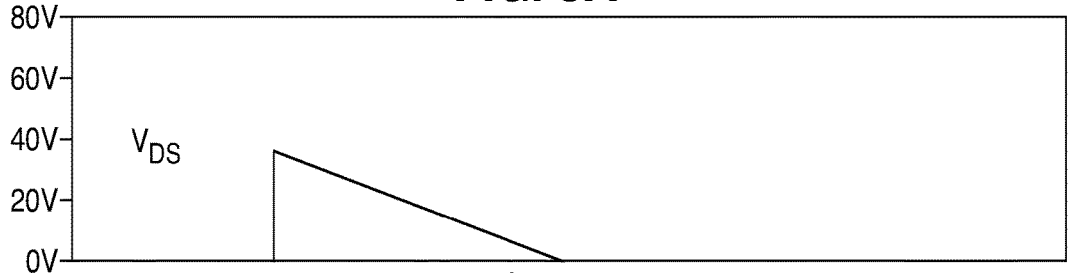
Figure 3C:
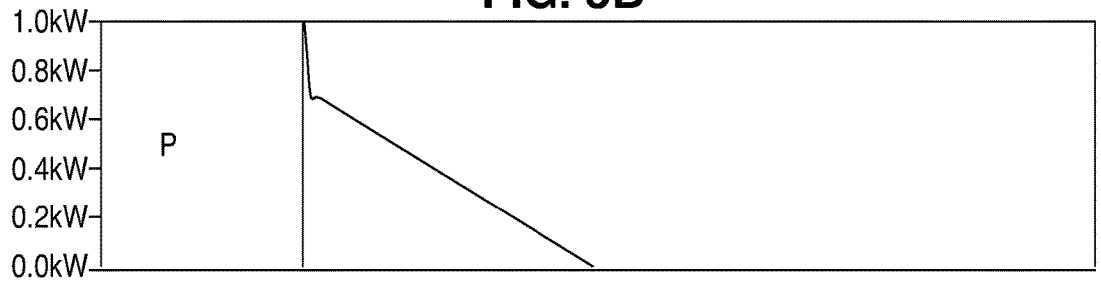
Figure 3D:
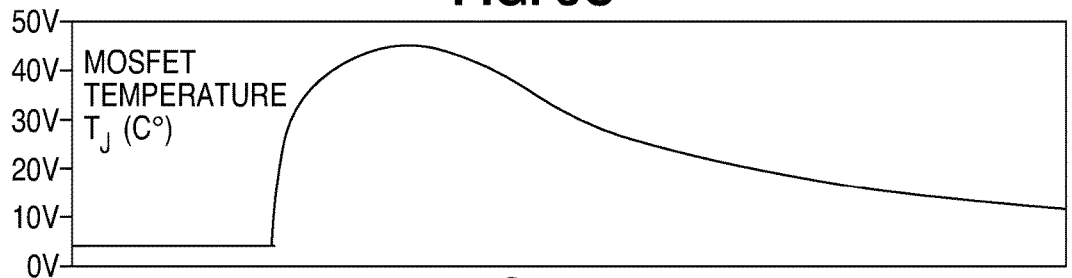
Figure 3E:
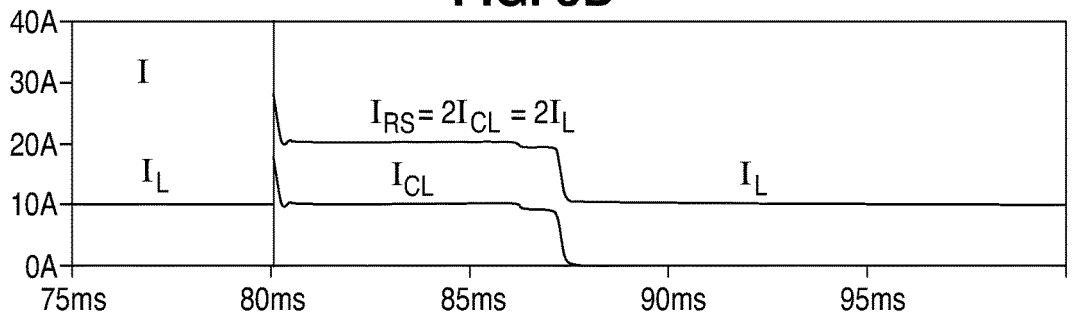

Some LTspice simulation results of the circuit of FIG. 1 upon a 36V input step are shown in FIGS. 3A-3E. FIG. 3A shows the voltage step from an initial 36V to 72V, such as due to a new battery replacing an old battery. The $V_{IN}$ is the absolute voltage, and the RTN voltage may be 0V, while the other terminal is connected to −36V or −72V, such as in some telecom systems. FIG. 3B shows the $V_{DS}$ of the MOSFET Q1 ramping down as the bypass capacitor 12 charges up as a result of the voltage step. FIG. 3C shows the power dissipated by the MOSFET Q1 (the $V_{DS}(I_{CL}+I_L)$). FIG. 3D shows the MOSFET Q1 temperature, which peaks at a minimum temperature due to the optimal value of the ramp capacitor 16. And, FIG. 3E shows the MOSFET Q1 initially conducting only the load current $I_L$, since the bypass capacitor 12 has been charged, and then showing the MOSFET Q1 conducting the $2I_{CL}$ (or $2I_L$) current after the voltage step, until the bypass capacitor 12 becomes fully charged.

In the simulation of FIGS. 3A-3E, the load 14 of FIG. 1 is a constant current of 10 A. The adaptive ramp control circuit forces $I_{RS}=20$ A or $I_{CL}=I_L=10$ A during the ramp. Using a thermal model of the MOSFET Q1, the MOSFET Q1 temperature is also simulated and plotted out. By varying $C_R$ and monitoring the peak temperature, it can be shown that the peak temperature reaches its minimum when $C_R=C_{R,opt}$ or $I_{CL}=I_L$ not only for the constant current load but also for other types of load such as resistive or constant power load.

With reference to FIG. 1, upon the voltage step occurring, the drain of the MOSFET Q1 is closer to the return RTN voltage (e.g., 0V) than the source terminal. In the example of FIG. 3A, the source terminal is connected to −72 volts upon the replacement of a battery, while the drain is as −36 volts, since the bypass capacitor 12 was previously charged to −36 volts.

The non-inverting terminal of the high gain amplifier A1 is at VEE (i.e., −72V), and its inverting terminal is coupled to the top terminal of the ramp capacitor 16. The output of the amplifier A1 is coupled to a resistor R1, and the other terminal of the resistor R1 is coupled to the ramp capacitor 16. The feedback connection of amplifier A1 causes a charging current $I_{CR}$ to flow through the resistor R1 to charge the ramp capacitor 16 to make the top terminal of the ramp capacitor 16 equal VEE. As the drain voltage gets closer to the source voltage as a result of the bypass capacitor 12 charging (due to the voltage step), the charging current $I_{CR}$ continues to flow to keep the top terminal of the ramp capacitor 16 at VEE. Thus, the level of $I_{CR}$ is tracking the charging current $I_{CL}$ into the bypass capacitor 12.

The voltage at the output of the amplifier A1 is VEE+ ($I_{CR}$R1). This voltage is applied to the non-inverting input of the amplifier A2, and the inverting input of amplifier A2 is coupled to the source of the MOSFET Q1. The source voltage is VEE (the input voltage) minus the drop across the sense resistor $R_S$. Accordingly, the amplifier A2 feedback loop actively controls MOSFET Q1 to force $$I_{CR}R1 = I_{RS}R_S \qquad 21)$$

The output of amplifier A2 controls the bipolar transistor Q2 to tap off current from the current source I1 to control the MOSFET Q1 current ($I_{RS}$) to meet equation (22) below.

The value of $C_R$ is optimized to achieve the condition of equation (20) where the current conducted by the MOSFET Q1 during the bypass capacitor 12 charging time is $$I_{RS} = 2I_{CL} = 2I_L \qquad 22)$$

Accordingly, the minimum peak temperature of the MOSFET Q1 is adaptively achieved.

In the above example, the load 14 is assumed to be a constant current load for purposes of the simulation. However, the load can be any type of load, such as a purely resistive load or a constant power load.

FIGS. 4A-4E are simulation results with a resistive load of 5 Ohms. In this case, $I_L$ increases with $V_{OUT}$ ramping up (or $V_{DS}$ ramping down) and the adaptive ramp control forces the $I_{CL} = I_L$ along the way. Also shown in FIGS. 4A-4E is the start-up behavior, when an input voltage is initially connected to a powered down system, prior to the 36 volt input step (e.g., a battery replacement). In some applications this is a valid condition. The adaptive ramp control again forces $I_{CL}$ to match the start-up $I_L$. The start-up ramp, however, is much longer than that following the input step. This is because the start-up $I_L$ increases from zero, and so does $I_{CL}$. As a result, the peak temperature during start-up is lower than that caused by the input step, which is actually a desired behavior. Therefore, with a resistive load, the adaptive ramp control benefits both the start-up and the input step conditions.

Figure 4A:
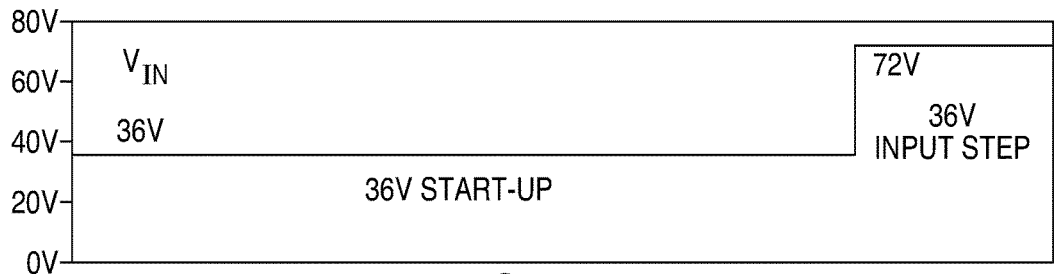
FIGS. 4A-4E are graphs obtained by simulations showing signals and temperatures in the circuit of FIG. 1 where the load is purely resistive, where a bypass capacitor is connected across the load. The simulation covers both a start-up time (where the bypass capacitor is being charged to an initial voltage) and after there is an input step, such as an increase in input voltage after the end of the start-up, to show how the inventive circuit of FIG. 1 dynamically adapts to different input voltages as the bypass capacitor charges to a steady state condition.
Figure 4B:
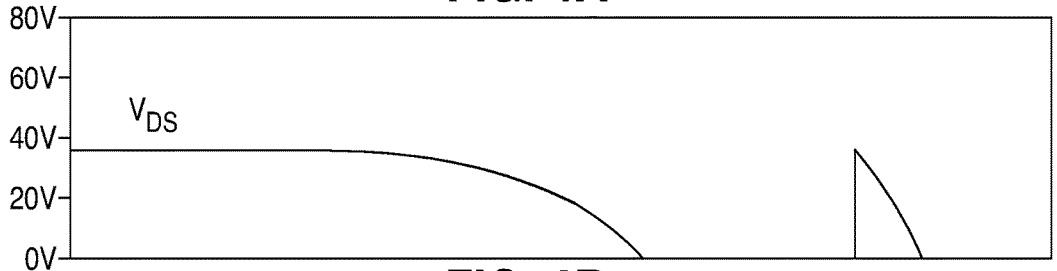
Figure 4C:
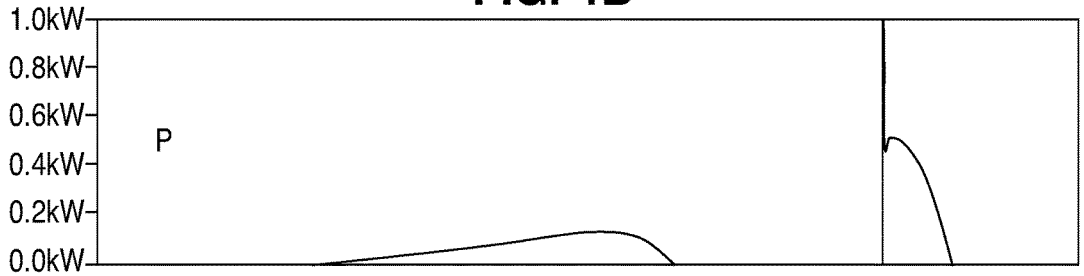
Figure 4D:
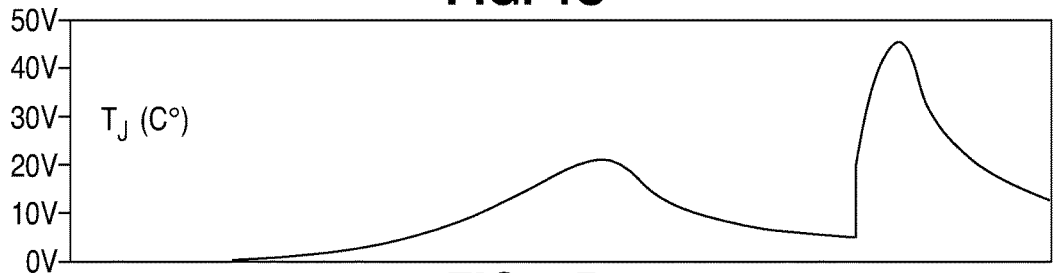
Figure 4E:
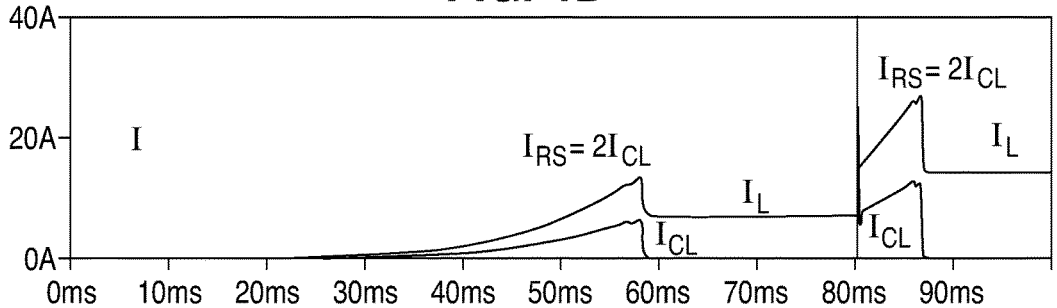

More specifically, FIG. 4A shows the original input voltage of 36 volts being stepped to 72 volts. FIG. 4B shows the change in $V_{DS}$ at start-up and after the voltage step. FIG. 4C shows the power dissipated by the MOSFET Q1 at start-up and after the voltage step. FIG. 4D shows the temperature of the MOSFET Q1 at start-up and after the voltage step, where the peak temperature is minimized at each stage due to the optimal selection of the value of the ramp capacitor 16. And FIG. 4E shows the load current $I_L$ and bypass capacitor charging current $I_{CL}$ at start-up and after the voltage step.

After the bypass capacitor 12 has been fully charged, the amplifier A2 will output a low voltage and turn off the bipolar transistor Q2, so the MOSFET Q1 is fully turned on.

Figure 5:
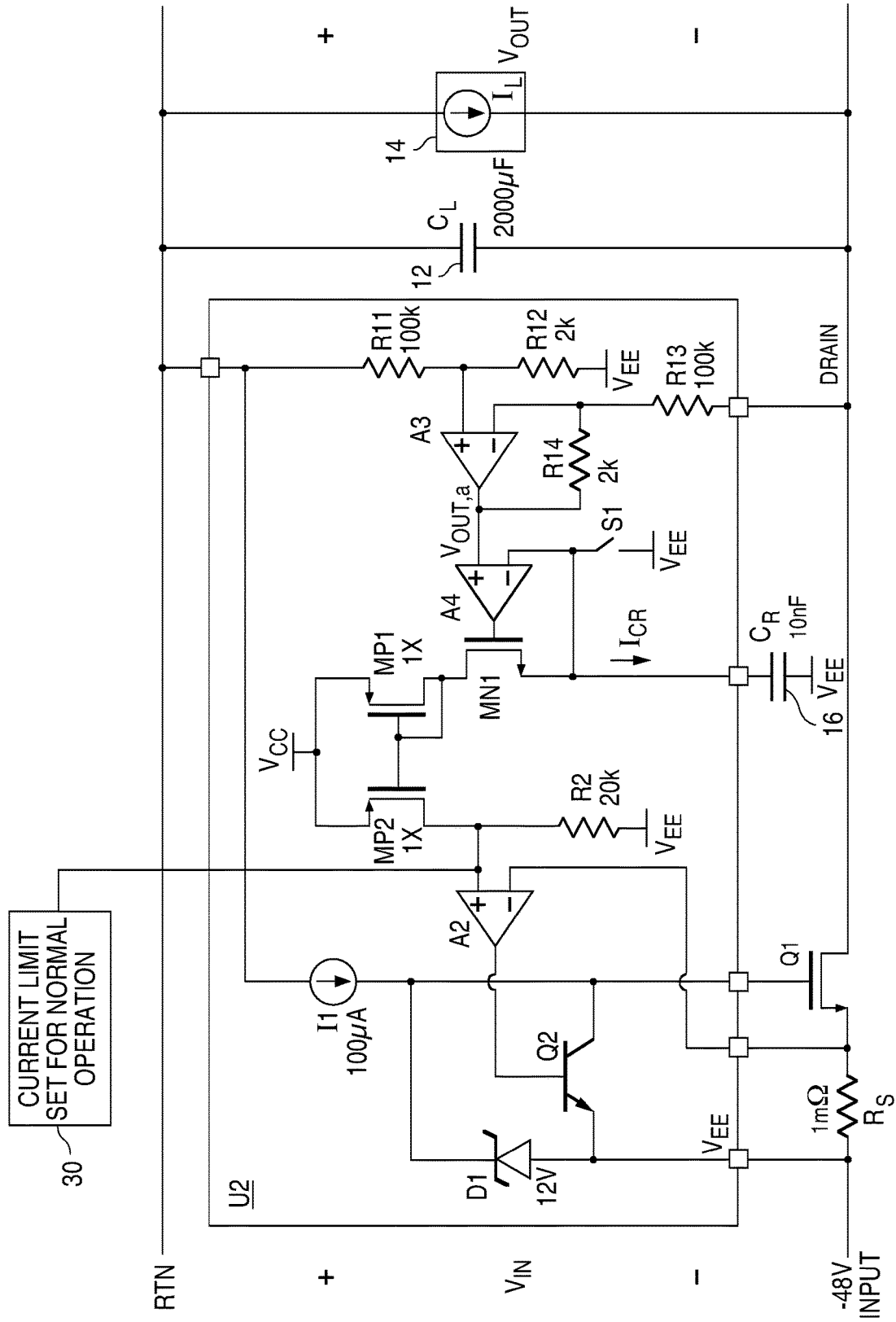
FIG. 5 illustrates another embodiment of a circuit that performs the same optimization as FIG. 1 but where the ramp capacitor can be a low voltage type, instead of the more expensive high voltage type used in FIG. 1.

FIG. 5 shows a variation of the adaptive ramp control circuit that monitors the ramp rate of $V_{OUT}$ instead of $V_{DS}$. In this technique, the ramp capacitor 16 can have a lower voltage rating compared to the ramp capacitor 16 of FIG. 1.

Amplifier A3, in conjunction with the associated resistors R11-R14 (R11/R12=R13/R14=r), continuously samples the attenuated output voltage $V_{OUT,a}$:

$$V_{OUT,a} = \frac{R12}{R11}(V_{RTN} - V_{DRAIN}) = \frac{R12}{R11}V_{OUT} = \frac{V_{OUT}}{r} \qquad 23)$$

where r is the attenuation factor (50 in the example of FIG. 5).

A resistor divider R11 and R12 is connected between RTN (e.g., 0V) and VEE (e.g., −48V). Another resistor divider R13 and R14 is connected between the output of the amplifier A3 and the drain voltage of the MOSFET Q1. The divided voltages are connected to the inputs of the differential amplifier A4.

Amplifier A4 drives NMOS transistor MN1 to apply $V_{OUT,a}$ to the ramp capacitor 16 and converts the attenuated ramp rate of $V_{OUT}$ to a current $I_{CR}$ that charges the ramp capacitor 16.

A PMOS transistor current mirror (MP1 and MP2) takes $I_{CR}$ and feeds it to resistor R2 ($V_{CC}$ is a locally generated low voltage supply). The top terminal of the resistor R2 is connected to the non-inverting input of the amplifier A2. The other terminal of resistor R2 is connected to VEE.

From this point, amplifier A2 works in the same way as in FIG. 1 and forces $I_{CL} = I_L$, if $C_R$ is chosen according to $$C_{R,opt} = \frac{2rR_S}{R2}C_L \qquad 24)$$

The advantage of this circuit is that the ramp capacitor 16 is detached from the drain node of the MOSFET Q1, which experiences sudden high voltage disturbances upon an input step or output short. The ramp capacitor 16 is now a low voltage capacitor, which not only saves cost but also makes it easier to select desired capacitor values.

A switch Si briefly closes after the bypass capacitor 12 has been fully charged up to discharge the ramp capacitor 16. At this point, the $V_{DS}$ of the MOSFET Q1 is near zero.

The sub-circuit U1 in FIG. 1 or U2 in FIG. 5 can be a stand-alone integrated circuit (IC) that exclusively manages start-up in-rush currents and input steps. It can also be a functional block of a general purpose hot swap controller IC, in which current limit and circuit breaker timer circuits protect the MOSFET upon overcurrent faults such as an output short.

Figure 6:
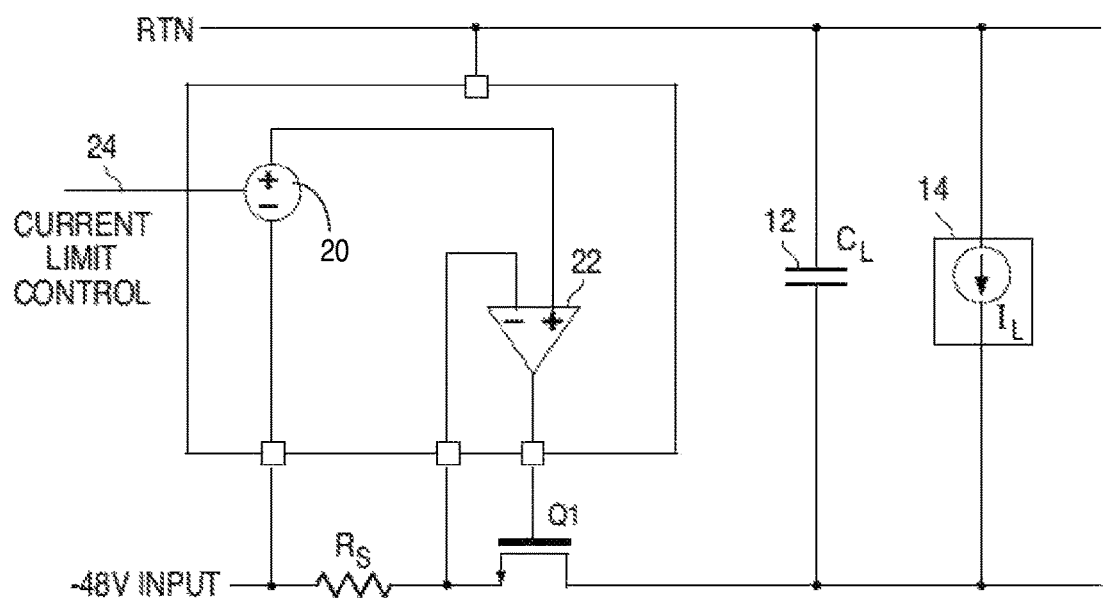
FIG. 6 illustrates a circuit that may be used when there is a known constant current load, where the circuit controls the pass MOSFET to conduct a current of $2I_L$ during the in-rush current phase to minimize the peak temperature of the MOSFET during this phase. The current limit may be changed during normal operation.

For a power system with a known constant current load and a bypass capacitor, the adaptive ramp control can be simplified to the circuit in FIG. 6, where the total current is set to a fixed current limit during the in-rush current phase. To achieve the optimum ramp upon an input step, just set the current limit to be twice the load current:

$$I_{LIM} = 2I_L \qquad 25)$$

In FIG. 6, a voltage source 20 is set so that the current through the MOSFET Q1 after an input voltage step is clamped at the optimal value (equation 25) during the in-rush current phase. The amplifier 22 controls the gate of the MOSFET Q1 so that the voltage drop across the sense resistor Rs is equal to the voltage generated by the voltage source 20. After the bypass capacitor 12 has been fully charged up, the voltage source 20 may be controlled by control signal 24 to generate a different voltage for a current limit during normal operation, which may be greater than or less than the $2I_L$ optimal current during start-up or the input step phase.

The method of the adaptive ramp control in this invention is not limited to the −48V system shown in the examples. It can also be used in a positive power system or other power systems that use a MOSFET to pass the power to the load.

In all circuits, the adaptive start-up or input step current control for the pass MOSFET can be set as described above, and, during normal operation (bypass capacitor charged up), a different current limit can be set that is based on other parameters. For example, while the adaptive start-up and input step control is based on achieving a minimum peak temperature of the MOSFET Q1 or based on achieving a predetermined peak temperature, the current limit during normal operation may be based on the worst case acceptable load current. Any current above that limit would then indicate a fault. Accordingly, a detector circuit may be employed in all the circuits described that indicates that the bypass capacitor has been fully charged, and then the MOSFET Q1 control is based on the fault current limit.

In one example, given that the non-inverting input into the amplifier A2 (FIGS. 1 and 5) becomes approximately VEE when the current $I_{CR}$ into the ramp capacitor 16 is near zero (representing that the bypass capacitor 12 is essentially fully charged), one input of a comparator may be connected to the non-inverting input of the amplifier A2. The other input of the comparator is then connected to a threshold voltage equal to VEE plus a small reference voltage (assuming that VEE is a negative voltage). When the voltage at the non-inverting input of the amplifier A2 goes below the threshold voltage, the output of the comparator triggers, signifying that the in-rush current phase is complete. The output of the comparator then causes a different current limit to be applied to the MOSFET Q1. In one example, the current limit circuit of FIG. 6 is then coupled to the MOSFET Q1 and the sense resistor Rs, such as by switches, and the circuit U1 or U2 is then disabled.

Alternatively, the triggering by the comparator may cause the current limit set circuit 30 to apply a fixed current limit voltage at the non-inverting input of the amplifier A2.

In another example, a timer circuit may also be used. For example, in the circuits FIGS. 1 and 5, the non-inverting input of the amplifier A2 may simply be connected to a reference voltage, generated by the current limit set circuit 30, that sets the fixed current limit during normal operations.

And, in FIG. 6, the control signal 24 may set the current limit during normal operations after it is detected that the in-rush current phase is over.

Although a single bypass capacitor 12 is shown for simplicity, the bypass capacitor may comprise multiple capacitors and include capacitance in the load 14.

In an alternative system, a p-channel MOSFET is used instead of the n-channel MOSFET Q1, and the configuration of the circuit is changed accordingly.

Although a sense resistor is shown for detecting current, current detection may be performed using other means, such as detecting a voltage drop across the MOSFET.

Although optimal settings for the current through the pass MOSFET Q1 have been described, in actuality, tolerances of component values will only achieve an approximate optimal setting. As such, in an actual embodiment, the pass current though the MOSFET Q1 may be plus or minus 10% of the optimal current, as set by the selection of the components described above, while still achieving the benefits of the invention. Accordingly, the term "approximately" conveys a tolerance of plus or minus 10% of the optimal current. As shown in FIG. 2, a slight offset from the optimal current settings does not significantly change the P√t value, which determines the temperature of the MOSFET.

Although the peak temperature of the MOSFET will not be a minimum if the in-rush current is not equal to twice the load current (i.e., $I_{CL}$ is not equal to $I_L$), the benefits of the invention will still be achieved by the in-rush current being somewhat close to twice the load current. For example, one can use this discovery to control the peak temperature by setting the in-rush current through the MOSFET so that the charging current of the bypass capacitor due to the voltage step has a particular fixed ratio to the load current. In one example, the charging current of the bypass capacitor can be controlled to have a fixed ratio between about 0.5-1.5 of the load current and still provide an improvement over the prior art. Therefore, achieving the absolute minimum temperature of the MOSFET is not necessary to the invention.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A method for controlling a pass MOSFET between an input voltage and a load when there is an input voltage step between a source and drain of the MOSFET, wherein a bypass capacitor is connected in parallel with the load and charges during the voltage step, the method comprising:
    setting an in-rush current through the MOSFET so that the charging current of the bypass capacitor due to the voltage step has a fixed ratio to the load current;
    determining when the bypass capacitor is sufficiently charged; and
    setting a current limit, different from the in-rush current, after it has been determined that the bypass capacitor has been sufficiently charged.

2. The method of claim 1 wherein the fixed ratio between the charging current of the bypass capacitor and the load current is set approximately to one to achieve a minimum peak temperature of the MOSFET during an in-rush phase.

3. The method of claim 1 further comprising the step of sensing the voltage step.

4. The method of claim 1 wherein the load is a constant current load.

5. The method of claim 1 wherein the load is a resistive load.

6. The method of claim 1 wherein the load is a constant power load.

7. A method for controlling a pass MOSFET between an input voltage and a load when there is an input voltage step between a source and drain of the MOSFET, wherein a bypass capacitor is connected in parallel with the load and charges during the voltage step, the method comprising:
    setting an in-rush current through the MOSFET so that the charging current of the bypass capacitor due to the voltage step has a fixed ratio to the load current;
    generating a first current that charges a first capacitor to keep a first terminal of the first capacitor at a first voltage, wherein a second terminal of the first capacitor is coupled to the drain of the MOSFET;
    flowing the first current through a first resistance to obtain a first voltage;
    applying the first voltage to a first input of a differential amplifier;
    applying a second voltage, corresponding to the actual in-rush current through the MOSFET, to a second input of the differential amplifier; and
    controlling a current through the MOSFET based on an output of the differential amplifier, wherein the first current tracks the charging of the bypass capacitor to maintain a fixed ratio between the charging current of the bypass capacitor and the load current.

8. A circuit for controlling a pass MOSFET between an input voltage and a load when there is an input voltage step between a source and drain of the MOSFET, wherein a bypass capacitor is connected in parallel with the load and charges during the voltage step, the circuit comprising:
- a sense resistor connected in series with the MOSFET for sensing an in-rush current through the MOSFET;
- a feedback circuit coupled to the sense resistor and a gate of the MOSFET,
- wherein the feedback circuit controls the in-rush current through the MOSFET to maintain a fixed ratio between the charging current of the bypass capacitor and a real time load current;
- a detection circuit for determining when the bypass capacitor is substantially charged; and
- a current limit circuit that sets a current limit of the MOSFET, different from the in-rush current, after it is determined that the bypass capacitor has been substantially charged up.

9. The circuit of claim 8 wherein the feedback circuit sets the fixed ratio between the charging current of the bypass capacitor and the load current approximately to one to achieve the minimum peak temperature of the MOSFET.

10. A circuit for controlling a pass MOSFET between an input voltage and a load when there is an input voltage step between a source and drain of the MOSFET, wherein a bypass capacitor is connected in parallel with the load and charges during the voltage step, the circuit comprising:
- a sense resistor connected in series with the MOSFET for sensing an in-rush current through the MOSFET;
- a feedback circuit coupled to the sense resistor and a gate of the MOSFET,
- wherein the feedback circuit controls the in-rush current through the MOSFET to maintain a fixed ratio between the charging current of the bypass capacitor and the load current, and
- wherein the feedback circuit comprises a voltage source generating a first voltage that approximately equals a voltage across the sense resistor when the ratio between the charging current of the bypass capacitor and the load current is fixed.

11. The circuit of claim 10 further comprising a control circuit coupled to the voltage source for changing the first voltage to a second voltage to set a particular current limit of the MOSFET after the bypass capacitor has been charged up.

12. A circuit for controlling a pass MOSFET between an input voltage and a load when there is an input voltage step between a source and drain of the MOSFET, wherein a bypass capacitor is connected in parallel with the load and charges during the voltage step, the circuit comprising:
- a sense resistor connected in series with the MOSFET for sensing an in-rush current through the MOSFET;
- a feedback circuit coupled to the sense resistor and a gate of the MOSFET,
- wherein the feedback circuit controls the in-rush current through the MOSFET to maintain a fixed ratio between the charging current of the bypass capacitor and the load current, and
- wherein the feedback circuit comprises:
  - a first capacitor having a first terminal coupled to the drain of the MOSFET;
  - the first capacitor having a second terminal coupled to a first input of a first transimpedance amplifier;
  - wherein the first transimpedance amplifier employs a resistance between the output of the amplifier and the second terminal of the capacitor,
  - wherein the transimpedance amplifier generates a first current that charges the first capacitor to keep the second terminal of the first capacitor at a first voltage corresponding to an input voltage applied to the sense resistor, wherein the first current tracks the charging of the bypass capacitor; and
  - a control circuit coupled to the output of the transimpedance amplifier, a gate of the MOSFET, and the sense resistor,
  - the control circuit controlling a current through the MOSFET to maintain the fixed ratio between the charging current of the bypass capacitor and the load current.

13. A circuit for controlling a pass MOSFET between an input voltage and a load when there is an input voltage step between a source and drain of the MOSFET, wherein a bypass capacitor is connected in parallel with the load and charges during the voltage step, the circuit comprising:
- a sense resistor connected in series with the MOSFET for sensing an in-rush current through the MOSFET;
- a feedback circuit coupled to the sense resistor and a gate of the MOSFET,
- wherein the feedback circuit controls the in-rush current through the MOSFET to maintain a fixed ratio between the charging current of the bypass capacitor and the load current, and
- wherein the feedback circuit comprises:
  - a first capacitor having a first terminal coupled to an input voltage applied to the sense resistor;
  - the first capacitor having a second terminal coupled to receive a first current that charges the first capacitor to keep the second terminal of the first capacitor at a first voltage, wherein the first current tracks the charging of the bypass capacitor;
  - a resistance coupled so that a second current proportional to the first current flows through the resistance to create a second voltage; and
  - a control circuit coupled to the second voltage, a gate of the MOSFET, and the sense resistor,
  - the control circuit controlling a current through the MOSFET to maintain the fixed ratio between the charging current of the bypass capacitor and the load current.

14. The circuit of claim 13 further comprising:
- a differential amplifier receiving a third voltage proportional to the input voltage and receiving a fourth voltage created by a resistive divider coupled between an output of the differential amplifier and the drain of the MOSFET, wherein an output of the differential amplifier generates the first voltage, and wherein the first voltage tracks the charging of the bypass capacitor.

* * * * *